United States Patent [19]

Elrod

[11] Patent Number: 4,654,793

[45] Date of Patent: Mar. 31, 1987

[54] SYSTEM AND METHOD FOR REGISTERING AND KEEPING TRACK OF THE ACTIVITIES OF ATTENDEES AT A TRADE SHOW, CONVENTION OR THE LIKE

[75] Inventor: Philip C. Elrod, Richardson, Tex.

[73] Assignee: Showdata, Inc., Richardson, Tex.

[21] Appl. No.: 661,095

[22] Filed: Oct. 15, 1984

[51] Int. Cl.[4] ............................................. G06F 15/30
[52] U.S. Cl. .................................... 364/401; 235/380
[58] Field of Search ............... 364/401, 402, 400, 407, 364/408, 409; 235/380, 382

[56] References Cited

U.S. PATENT DOCUMENTS

| 3,622,995 | 11/1971 | Uselma Clarke et al. | 235/382 |
| 3,636,315 | 1/1972 | Comeaee | 364/406 |
| 4,026,642 | 5/1977 | Tanaka et al. | 364/400 |
| 4,423,314 | 12/1983 | Kato et al. | 235/382 |
| 4,475,153 | 10/1984 | Kihara et al. | 364/400 |
| 4,528,442 | 7/1985 | Endo | 235/382 |
| 4,538,056 | 8/1985 | Young et al. | 235/382 |

OTHER PUBLICATIONS

Ulrich Homborg, 'Transdata 970 Terminal System', Sep. 1978; 119–123.

*Primary Examiner*—Jerry Smith
*Assistant Examiner*—Kim Thanh Bui
*Attorney, Agent, or Firm*—W. Kirk McCord

[57] ABSTRACT

A system and method for registering and keeping track of the activities of attendees at a trade show, convention or the like. Each registrant is assigned a unique registration number, which is printed in bar-coded form on an identification badge, which also includes the name and professional affiliation of the attendee. Registration information, including the name, address, business affiliation and registration number of the attendee, is permanently stored in a central data base. Each booth or exhibit at the trade show or convention is equipped with an information storage device for recording the visits of individual attendees. The information storage device includes a bar-code decoder for reading the bar-coded registration number from the attendee's identification badge and from a bar-coded menu of information requests and for storing the information along with a record of the time of day and the date of the visit. At the end of the day or at the end of the trade show or convention, the stored information may be transferred by cable or telecommunications link to a main data base, where the information is processed along with the registration information to provide selected compilations of data relating to the attendees and their activities at the trade show or convention.

21 Claims, 18 Drawing Figures

MAIN DATA BASE

SYSTEM AND METHOD FOR REGISTERING AND KEEPING TRACK OF THE ACTIVITIES OF ATTENDEES AT A TRADE SHOW, CONVENTION OR THE LIKE

BACKGROUND OF THE INVENTION

1. Field of the Invention

This invention relates to systems and methods for collecting information and in particular to a system and method for registering and keeping track of the activities of attendees at a trade show, convention, or the like.

2. Description of the Prior Art

A great deal of planning and organization is necessary to put on a trade show, convention, or other public or quasi-public event involving a large number of participants. Prospective attendees must be notified regarding the time and place of the event, as well as the activities which will take place at the event, and registrations must be handed expeditiously, particularly when large numbers of attendees are expected.

Registration procedures typically involve the attendee's completing a registration form, either in advance if he or she decides to register early, or "at the door" prior to being admitted to the event. An identification badge is then prepared by writing or typing pertinent information, such as the name, address and/or business affiliation of the attendee, on the badge. A registration number may also be assigned to each attendee and reproduced on his badge. Furthermore, if the event includes special activities, such as, for example, seminars, workshops and banquets, to which entry will be limited to selected attendees, special tickets or other passes must be issued for each of these special activities, which further complicates the registration process.

At a crowded trade show or convention, it is often difficult for individual operators of a booth or exhibit to keep track of the flow of visitors to their respective booths or exhibits and to record all of the many requests for information and inquiries made by the visitors. It is customary for visitors to leave business or other "calling" cards at the booths, together with handwritten inquiries and requests for additional information concerning the products or services displayed at that booth. In addition, the operator of the booth may want to keep track of the visitors to his booth. Unfortunately, the prior art provides no efficient way to keep track of the identities, business affiliations and specific inquiries and requests of these visitors, particularly when several of them converge on a booth at the same time.

At some trade shows and conventions, plastic credit card-like identification badges are issued to the attendees and each both operator is equipped with a device similar to a credit card machine for generating credit card-like receipts containing the information on the badge. Although basic information about the visitor such as his name, address and business affiliation may be recorded, any specific inquiries or areas of interest expressed by the visitor must be manually recorded by the booth operator.

Another problem often encountered by the booth operator is the problem of visitor flow. It is often difficult to determine when or if additional personnel are needed to staff a particular booth or exhibit at certain times of the day when visitor flow is particularly heavy. Because each show is unique in its schedule and offerings, it is difficult to predict the times at which the visitor flow will be particularly heavy or light, so that staffing requirements can be met.

OBJECTS OF THE INVENTION

It is therefore the principal object of the invention to provide an improved system and method for registering and keeping track of the activities of the attendees at a trade show, convention or the like.

It is another object of the invention to provide a computer-implemented system and method for registering and keeping track of the activities of the attendees at a trade show, convention or the like.

It is still another object of the invention to provide a computer-implemented system and method for collecting, storing and processing information relating to the identity and business affiliation of each of the attendees at a trade show, convention or the like.

It is a further object of the invention to provide an improved system and method for keeping track of the flow of visitors to a particular booth or exhibit at a trade show, convention or the like and for recording the nature of the inquiries and requests for informatin made by such visitors.

It is still a further object of the invention to provide a computer-implemented system and method for compiling selected marketing and promotional data, based on information collected at a trade show, convention or the like.

SUMMARY OF THE INVENTION

These and other objects are accomplished in accordance with the present invention by providing an electronic system for registering attendees at an event, which is comprised of input means for entering selected information relating to the attendees into the system; processing means for processing the selected information entered into the system in accordance with a predetermined set of instructions; means for storing the processed information; and output means for producing a hard copy of selected information identifying each attendee.

In one embodiment, the system further includes means for coding an assigned registration number for each attendee into bar-coded form and the output means includes means for printing an identification badge for each attendee having the name and professional affiliation of the attendee in human-readable form and his registration number in bar-coded form. In another embodiment, the identification badge includes bar-coded information indicating the activities to which the attendee is entitled admission at the event.

In a preferred embodiment the registration system of the present invention includes keyboard means having a plurality of user activatable keys for entering information into the system; computing means for processing the information entered therein in accordance with a permanent instruction set stored in a read-only-memory (ROM); at least one portable magnetic diskette for storing selected information processed by the computing means; and a printer for producing an identification badge for each attendee and other selected registration information. Registration information stored on the magnetic diskette may then be transferred to a main data base.

In another aspect of the invention an electronic information system is provided for keeping track of selected activities of attendees at the event, such as, for example, a particular booth or exhibit at a trade show or convention. The electronic information system is comprised of means for providing a first set of information codes identifying the respective attendees; means for providing a second set of information codes representing selected activities at the event; means for reading said first set of information codes and generating a respective first set of electrical signals indicative thereof and for reading selected ones of said second set of information codes representing the respective activities of individual attendees at the event and generating a respective second set of electrical signals indicative thereof; processing means for processing first and second sets of electrical signals in accordance with a predetermined set of instructions; and memory means for storing the processed information.

In one embodiment the electronic information system includes timekeeping means for keeping track of time of day and date. The processing means is responsive to an output signal from the timekeeping means indicative of the time and day and data for writing into the memory means the time of day and date on which information is stored in the memory means, so that a record is maintained of the visits of all attendees to a particular location by time of day and date. In another embodiment the information management system includes means for communicating with an external data processing system, so that the information collected can be transmitted to a main data base. The information is transferred to the main data base preferably either by telecommunications link or by electrical cable connection. In yet another embodiment the information is also transferred to one or more portable magnetic diskettes so that the information can be retrieved without the necessity of accessing the central data base.

In a preferred embodiment the reading means is comprised of a bar-code reader and decoder for reading bar-coded information from an attendee's identification badge and generating an electrical information signal indicative thereof. Each location at the event is equipped with a menu of anticipated inquiries and requests for information, which are recorded in bar-coded form. Thus, when an attendee visits a particular location, such as an individual booth or exhibit, at the event, his visit may be recorded by reading the bar-coded identification information on his identification badge and reading the bar-coded information corresponding to the particular inquiries and information requests made by that attendee during his visit and storing this information in the system memory along with the time of day and date on which his visit occurred. At the end of each day or at the end of the event, information may be transferred to the main data base, whereupon the information is processed and sorted to provide selected compilations of information of interest to the promoter of the event and/or to the individual booth operator.

The main data base preferably includes a computer having a hard disk storage capability and a printer for generating hard copy printouts of the selected compilations of information for the benefit of the user. For example, the information may be sorted and a list compiled showing the identities of all visitors to a particular booth or exhibit at a trade show or convention in chronological order; a listing of all such visitors from a particular company, city or state; and a listing of all visitors who have made a particular request or inquiry. This type of information is valuable to a booth operator because it allows him not only to answer the specific inquiry or request for information made by the visitors to his booth, but also provides him with valuable marketing information from which he can generate promotional mailing lists and mailing labels.

In a preferred embodiment the information management system is comprised of one or more portable, modular units containing a bar-code reader and decoder; a timekeeping device for keeping track of time of day and date, a conventional disk drive unit for storing information on a floppy diskette; input/output circuitry for communicating with an external data processing system by telecommunications link or alternatively by direct electrical cable connection; and a main computer having a hard disk storage capability for receiving information from the modular units and processing such information to provide selected compilations of data relating to the activities of the attendees at the event, such as, for example, a trade show, convention or the like.

BRIEF DESCRIPTION OF THE DRAWINGS

Still further objects and advantages of the invention will be apparent from the following detailed description of a preferred embodiment when read in conjunction with the accompanying drawings, wherein.

DETAILED DESCRIPTION OF THE PREFERRED EMBODIMENTS

Figure 1:
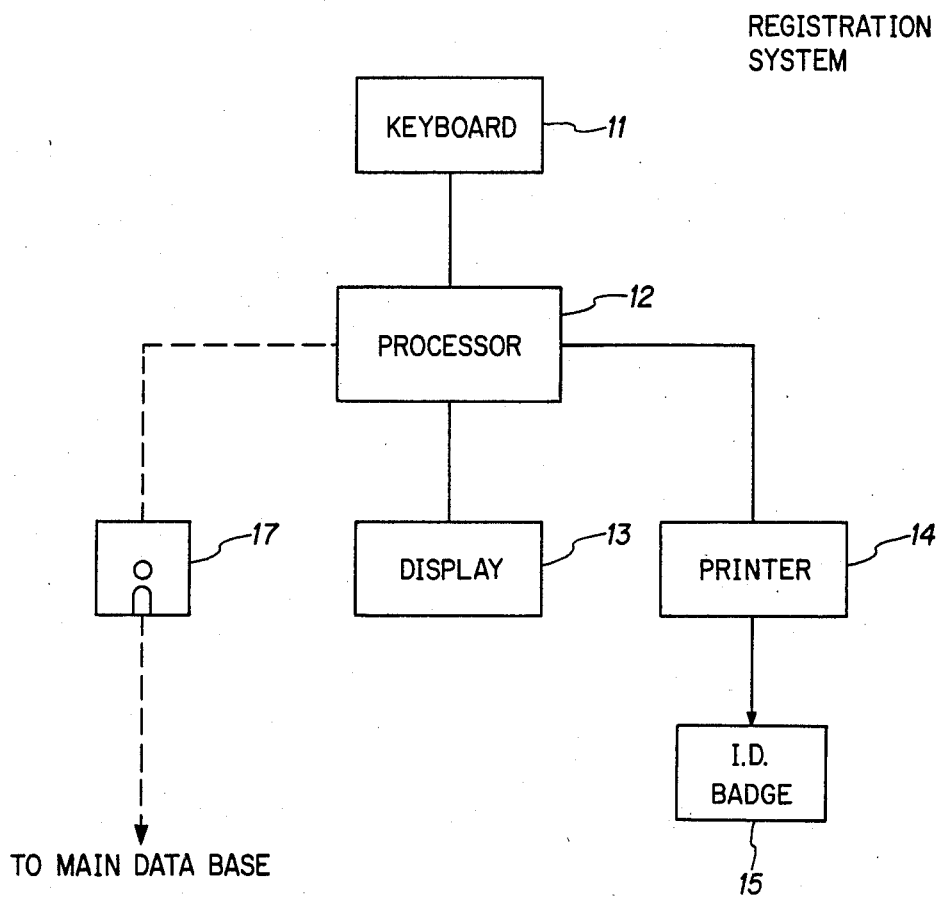
FIG. 1 is a block diagram of an electronic system for registering attendees at an event according to the present invention.

In the description which follows, like parts are marked throughout the specification and drawings with the same reference numerals, respectively. The drawings are not necessarily to scale and in some instances proportions have been exaggerated in order to more clearly depict certain features of the invention.

Referring now to FIG. 1, an electronic system for registering attendees at a trade show, convention or the like, in accordance with the present invention, is depicted. The registration system includes a keyboard 11 for entering information into the registration system; a data processor 12 for processing the information entered into the registration system in accordance with a predetermined set of instructions stored therein; a display 13, which is preferably a cathode ray tube (CRT) display, for displaying selected information entered into the system and processed by data processor 12; and a printer 14 for printing selected registration information, including an identification badge 15 for each attendee.

The functions of keyboard 11, processor 12 and display 13 are preferably provided by a single microcomputer, such as, for example, the IBM Personal Computer, manufactured and sold by International Business Machines Corporation, or a personal computer which is compatible with the IBM Personal Computer. The personal computer used in connection with the registration system should include a disk drive capability for storing registration information on a portable magnetic diskette, such as floppy diskette 17. Registration information stored on diskette 17 is transferred to a main data base for permanent storage, as will be described in greater detail hereafter. Printer 14 is preferably a Model 8625 thermal dot matrix printer, manufactured and sold by Intermec Corporation, which has the capability of printing bar-coded information and graphics.

Each attendee is assigned his or her own registration number, which is printed by printer 14 on identification badge 15 in bar-coded form. The name and professional affiliation (e.g. company name) of the attendee will also be printed on identification badge 15 in standard lettering to facilitate interaction with other attendees at the show.

The registration system of the present invention may be used for early registration of attendees in advance of the show, as well as to expedite "on site" registration on the day of the show. Selected registration information is stored on floppy diskette 17, by which registration information is transferred to the main data base for storage and processing.

Figure 2:
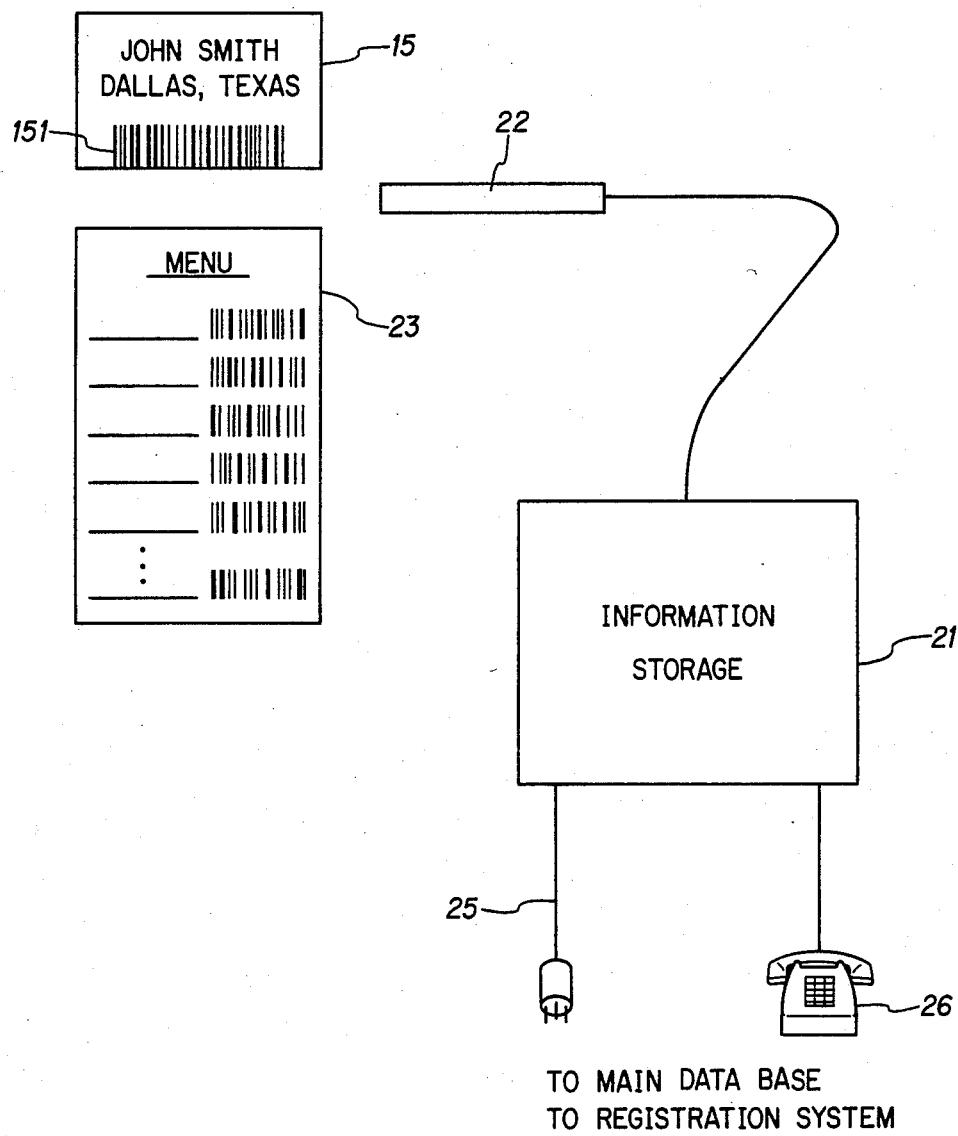
FIG. 2 is a block diagram of an electronic information system for keeping track of the attendees at an event according to the present invention.

Referring to FIG. 2, an information storage system, in accordance with the present invention, is depicted. Selected locations at the show, such as, for example, individual booths or exhibits, are each equipped with an information storage unit 21 for keeping track of the flow of visitors to that particular booth or exhibit during the show and for recording the nature of the inquiries and requests for information made by such visitors. A bar-code scanner device 22 is coupled to storage unit 21 for reading bar-coded information on the attendee's identification badge 15. Bar-code scanner 22 is preferably a contact-type wand scanner, manufactured and sold by Welch/Allyn.

When an attendee visits a particular booth or exhibit, the booth operator can record the visit by scanning the bar-coded portion 151 of identification badge 15 using scanner 22, thereby storing the Attendee's registration number in information storage unit 21. In addition, if the attendee makes specific inquiries or requests certain information about the products or services on display at a particular booth or exhibit, the booth or exhibit is equipped with a hard copy menu 23, which lists a number of standard requests for information in both human-readable and bar-coded form. For example, an attendee may request a product brochure or other information regarding a specific product or service. Rather than having to notate this request by hand, the booth operator merely scans with bar code scanner 22 the requestor's identification badge to record his registration number and the bar-coded portion of menu 23 which corresponds to that particular request, to record the request in information storage unit 21 along with the requestor's registration number. Multiple requests may be recorded by successively scanning the respective bar-coded portions of menu 23. Menu 23 may be printed in advance to include a number of standard requests most commonly made by visitors to a booth or exhibit at a trade show. A unique bar code is assigned to each such standard request on the menu. Alternatively, each individual booth operator may make up his own set of requests and assign a unique bar code to each of such requests on menu 23, so that menu 23 can be customized to suit the needs of the individual booth operator.

At the end of a particular day or at the end of the entire show, the information stored in information storage unit 21 is transferred to a main data base. Information transfer may be effected by first storing the information on one or more floppy diskettes (not shown), which are then loaded into the main data base or, alternatively, by transferring the information by means of a standard communications protocol, such as, for example, the RS 232 protocol, via an electrical cable 25 or by telephone modem 26. Information is stored on a floppy diskette by first transmitting the information to processor 12 (see FIG. 1), whereupon processor 12 loads the information onto a floppy diskette.

Figure 3:
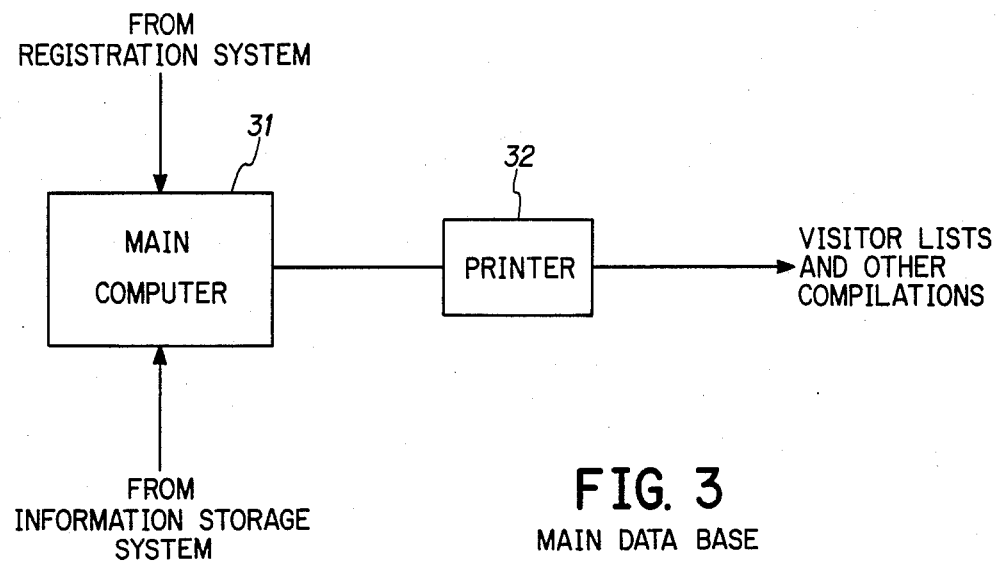
FIG. 3 is a block diagram of a main data base and central processing system according to the present invention.

Referring to FIG. 3, the main data base, which collects data from both the registration system and the information storage system, is shown. The main data base is comprised of a main computer 31 which is preferably a Model 4550 personal computer, manufactured and sold by Columbia Data Products. Main computer 31 preferably includes 128 kilobytes of storage memory and a 12 megabyte hard disk unit for storing data. It further includes at least one disk drive unit for receiving portable magnetic diskettes, such as floppy disks 17, two communication ports for simultaneously communicating with two information storage units 21, and one printer port for controlling a printer 32, which provides a hard copy of the output from main computer 31. Data from all of the information storage units 21 at the trade show or convention is stored in main computer 31 for processing in accordance with a predetermined set of instructions stored therein, as will be described in greater detail with respect to FIG. 6. Printer 32 is preferably a Model T300X printer, manufactured and sold by Printronix, Inc. Main computer 31 controls printer 32 to provide hard copy printouts of selected information, including lists of visitors to individual booths or exhibits and other compilations as desired.

Figure 4:
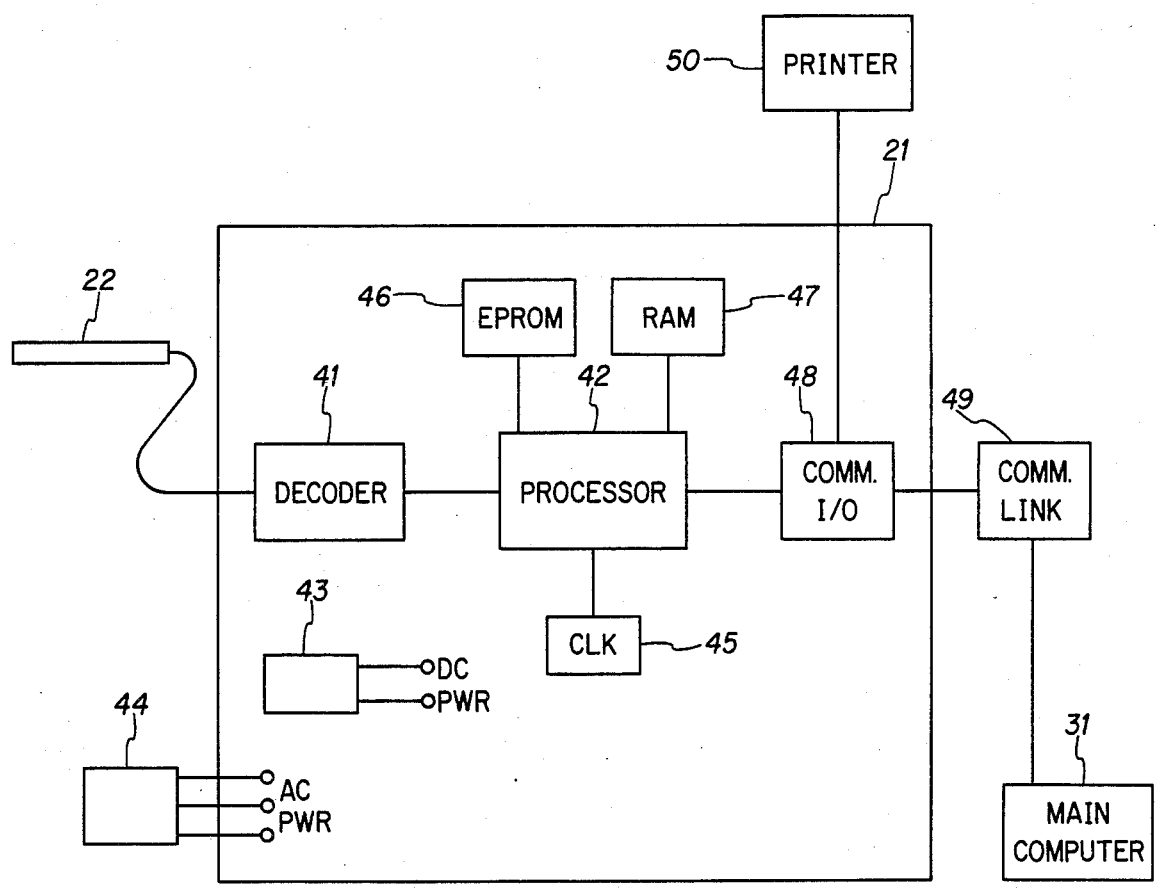
FIG. 4 is a block diagram of the major components of an information storage unit according to the present invention.

Referring to FIG. 4, the operation of information storage unit 21 is described in greater detail. Except for bar code scanner 22, the components of storage unit 21 are contained in a modular housing, which provides a portability feature for storage unit 21. Bar-coded information picked up by scanner 22 is decoded by bar code decoder 41 and transmits an electrical signal indicative thereof to processor 42. Decoder 41 is preferably an NCR 8301 bar-code decoder, manufactured and sold by the National Cash Register Company of Dayton, Ohio. The decoded information is stored in processor 42, which is preferably a micro-processor of the Zylog Z-80 type, manufactured and sold by Zylog, Inc. Processor 42 includes an on-board non-volatile random access memory (RAM) and one or more external non-volative RAM's 47 for storing the decoded information. Battery 43 functions as a back-up power supply in the event of the discontinuance or interruption of the main AC power supply 44, so that the information stored in RAM is not lost. The information storage capability of information storage unit 21 may be enhanced by adding additional RAM chips to the main circuit board thereof.

Timekeeping information is provided by clock circuit 45, which is preferably an MM58167A timekeepng chip, manufactured and sold by National Semiconductor Corporation, for keeping track of time of day on a 24-hour basis and calendar date. When information relating to the visit of an attendee to a particular booth or exhibit is transmitted by decoder 41 to processor 42, processor 42 addresses clock circuit 45 and receives information therefrom indicative of time of day and calendar date, which is stored in system memory along with the registration number of the attendee and the specific requests or inquiries made by that attendee at the booth or exhibit. Information is processed and stored by processor 42 in accordance with a permanent instruction set stored in a read only memory (ROM) and/or erasable programmable read only memory (EPROM), which may be on-board processor 42 and/or external thereto as depicted by EPROM 46.

Communications I/O circuitry 48 is provided for communicating with an external data processing system, such as main computer 31 of the main data base. Communication I/O circuitry 48 may be equipped to handle a plurality of communications protocols, such as, for example, the standard RS 232 protocol. Information may be transmitted to the main data base by means of an electrical cable 25 or by telecommunications link 49, which may include a conventional telephone modem 26 when transmission by cable 25 is not feasible. As an added precaution, information collected by storage unit 21 is transmitted via Communication I/O circuitry 48 to printer 50, which prints information relating to the visitors, including visitor name and time and date of visit, so that a hard copy record of the stored information is available as a backup. In one embodiment, printer 50 prints the stored information on an hourly basis from 10:00 A.M. to 6:00 P.M. during each day of the trade show or convention. Printer 50 is preferably a Model IMP printer, manufactured and sold by Fidelity Computer Products. Communication I/O circuitry 48 is also used to transmit stored information to processor 12 of the registration system described above, whereupon processor 12 transfers the information to a floppy diskette, as previously, described with reference to FIG. 2.

The battery back-up feature previously described allows information storage unit 21 to be fully portable, so that each unit 21 may be collected at the end of the trade show or convention and transported to the site of main computer 31 for transferring the information stored therein to main computer 31. The portability feature also allows units 21 to be transported to and from different locations at a trade show or convention and to be used at a multitude of trade shows or conventions.

Referring now to FIGS. 5A-5E, the operation of the registration system is shown in detail. Processor 12 is programable to automatically perform the registration functions set forth in FIGS. 5A-5E. The steps of the program are depicted FIG. 5A. Registration information for each attendee is entered into processor 12 by means of keyboard 11. Included in the information entered into processor 12 is a character code indicating whether or not a name tag is to be printed for a particular registrant. This character code is essentially a "yes" or "no" code, which is decoded by processor 12 to determine whether or not a name tag is to be printed for a particular registrant. The applicable character code is preferably entered by the user by means of keyboard 11. A "Y" key is entered to indicate "yes" (i.e., that a name tag is to be printed) and an "N" key is entered to indicate a "no" code (ie., a name tag is not to be printed). Registration information pertaining to a particular attendee is then entered in accordance with the procedure set forth in FIGS. 5B-5E. Processor 12 can be programmed to store various types of registration information pertaining to each attendee, including, but not limited to, the name, address and professional affiliation of each attendee.

Figure 5A:
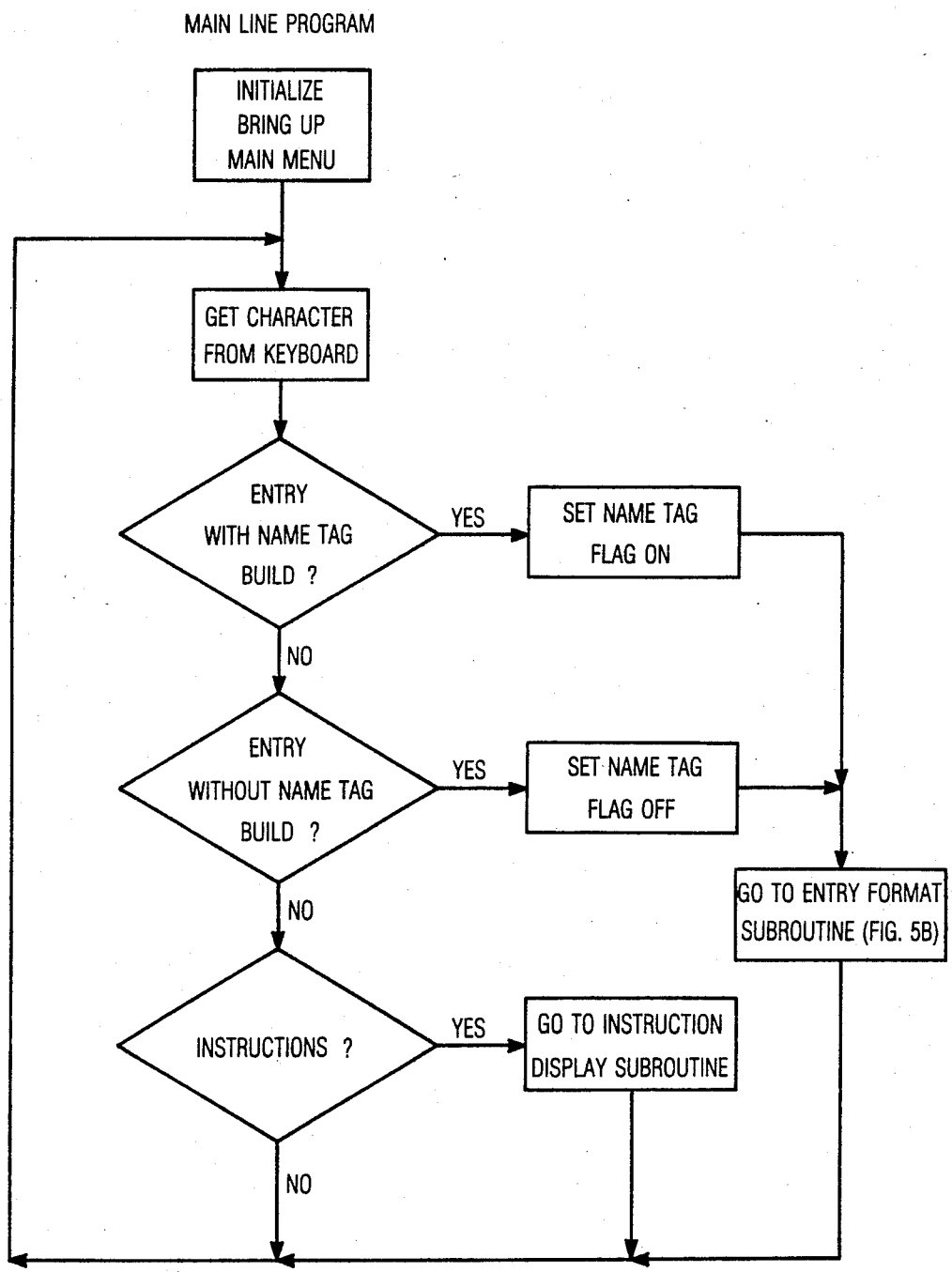
FIGS. 5A–5E, are flow diagrams depicting the sequence of operation of the registration system according to the present invention.
Figure 5B:
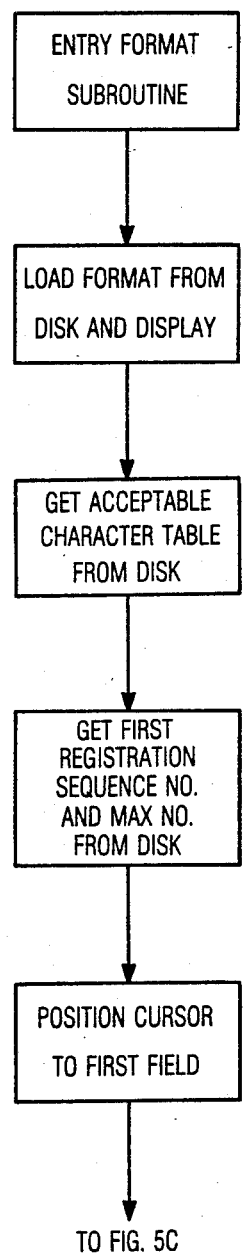

Referring to FIG. 5B, the entry format subroutine includes displaying the entry format on the CRT display of processor 12 and retrieving an acceptable character table and a sequential registration number and the maximum allowable registration number from a diskette (not shown) on which the program instructions are stored. The registration information for an attendee can then be entered.

Figure 5C:
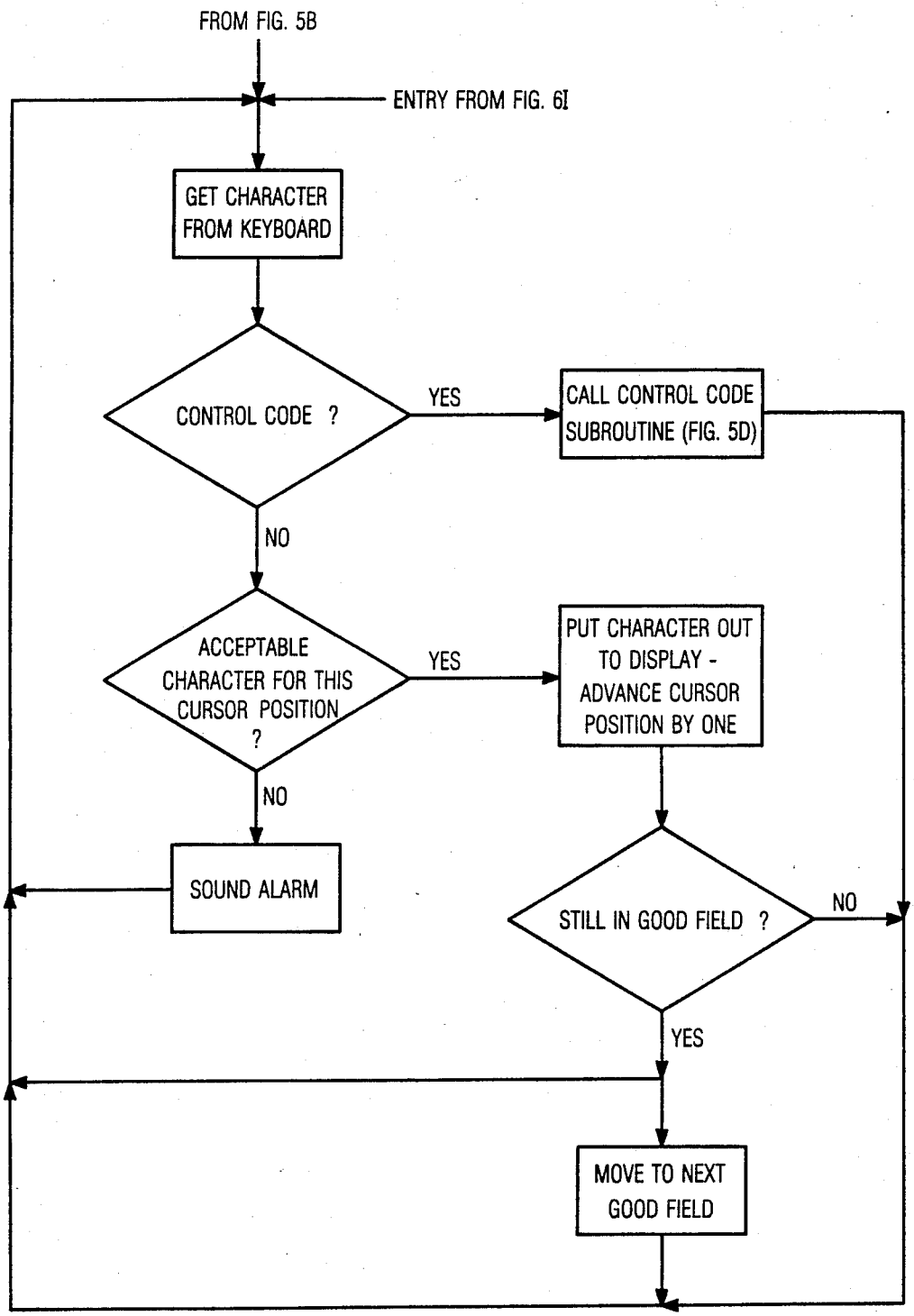

Referring to FIG. 5C, each character entered via keyboard 11 by the user is examined to determine whether it is an acceptable character for that particular cursor position on the CRT. If the character is acceptable, the cursor is advanced to the next field position for receiving the next character entry. If a character is not acceptable for a particular cursor position, an audible alarm is sounded to inform the user that the program will not accept that particular character entry. The acceptability of non-acceptability of each character involves a determination by processor 12 as to whether the user enters an alpha code at a particular cursor position at which an alpha entry should be made and correspondingly whether a numeric character is entered by the user at a particular cursor position at which only a numeric entry is suitable. For example, a first predetermined series of hexadecimal codes is typically assigned to alpha entries and a second predetermined series of hexadecimal codes is assigned to numeric entries. Depending upon the data entry format, processor 12 will check each entry to insure that alpha and numeric characters are entered in the corresponding correct locations in the data entry field. If a character entry represents a control code, the program will call the subroutine depicted in FIG. 5D.

Figure 5D:
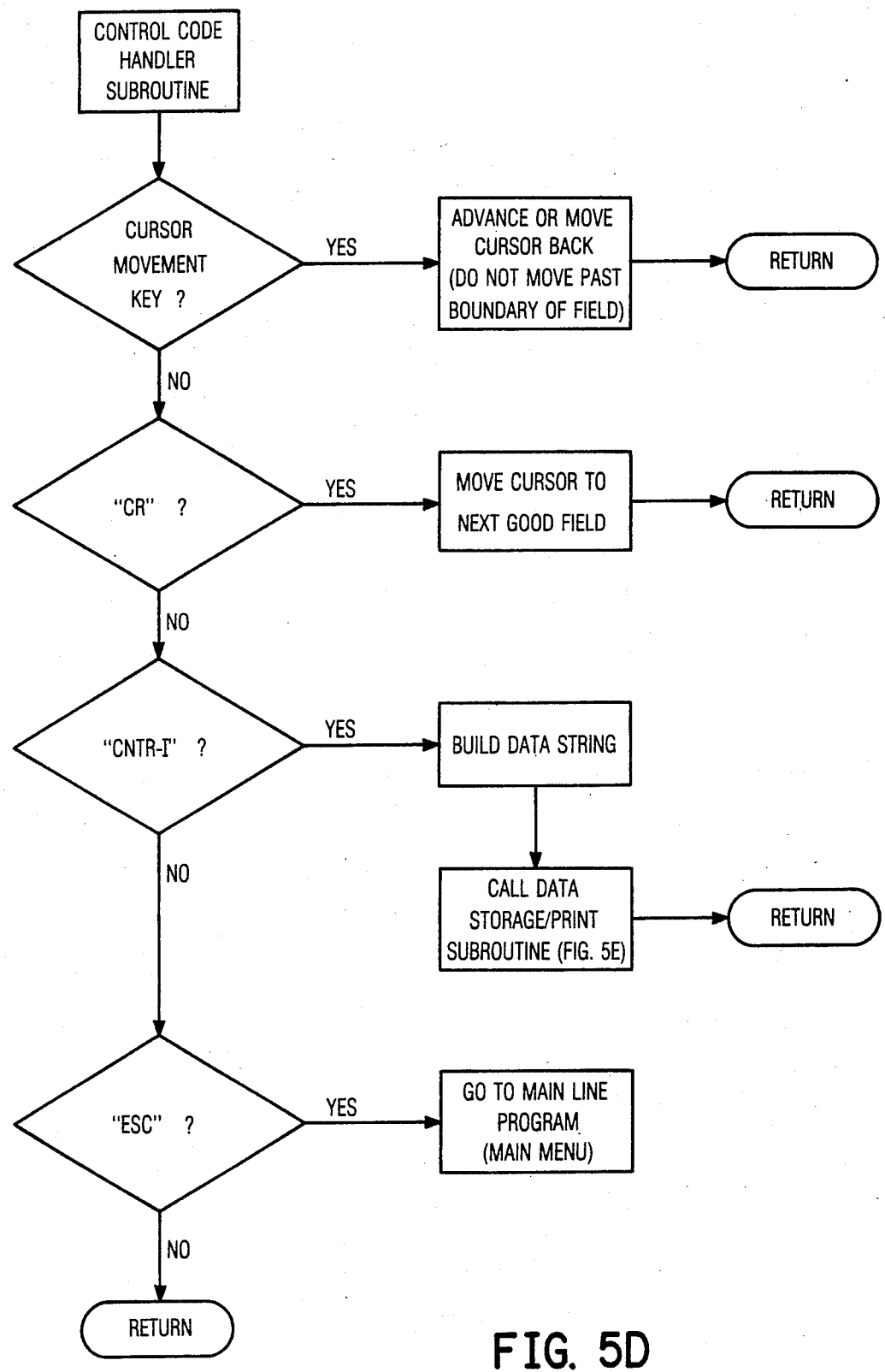
Figure 5E:
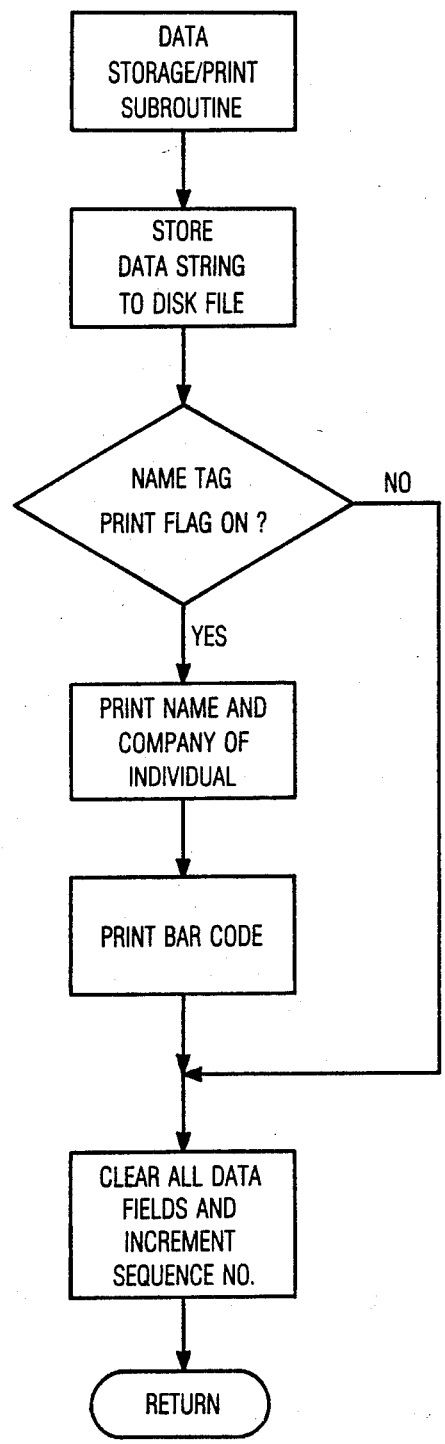

Referring to FIG. 5D, when a cursor movement key (i.e. a left or right pointing arrow) is pushed, the control code subroutine advances or moves the cursor back, but not beyond the boundary on either the left or right side of the CRT display. When a "CR" key is pushed the cursor is advanced to the next available field. A "CNTR-1" control key indicates that the entered data is to be stored and, if the Name Tag Flag on ON, an identification badge for a particular attendee is printed in accordance with the steps depicted in FIG. 5E. An "ESC" control key returns the program to the main menu program in FIG. 5A. Otherwise, after a control key entry is processed, the program returns to the entry point in FIG. 5C.

Registration information relating to each attendee is entered in sequence according to the procedure shown in FIG. 5C. When all of the necessary data has been entered, control code "CNTR-1" calls up the data storage/print subroutine, whereupon the registration information relating to each attendee is stored on diskette 15. If it is desired to print an identification badge for the attendee, the attendee's name and professional affiliation are printed in human-readable form on the badge and his registration number is printed in bar-coded form on the badge. The program then clears all data entry fields and increments the registration number to the next sequential number, whereupon information relating to the next attendee may be entered, beginning at the entry point in FIG. 5C.

Figure 6A:
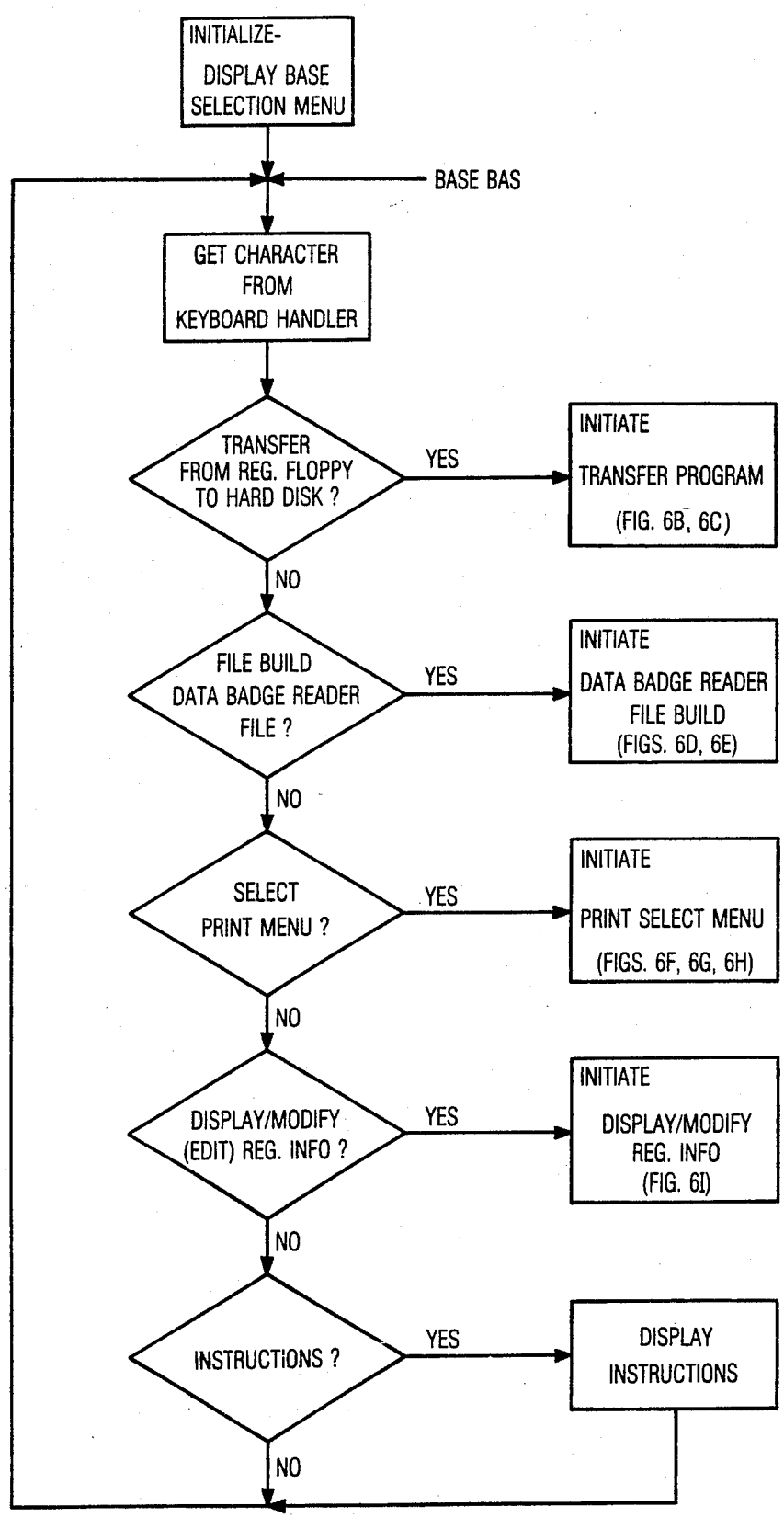
FIGS. 6A–6I are flow diagrams depicting the sequence of operation of the information system according to the present invention.

Referring to FIG. 6A, the operation of main computer 31 is shown. Registration information is transferred from floppy diskette 15 to a hard disk storage unit within main computer 31 by means of the transfer program depicted in FIGS. 6B and 6C. Data is collected and stored from the individual information storage units 21 according to the steps shown in FIGS. 6D and 6E. Selected information regarding the attendees and their activities at the trade show or convention is printed out in accordance with the instructions set forth in FIG. 6F. Registration information is displayed and modified in accordance with the program instructions set forth in FIG. 6G.

Figure 6B:
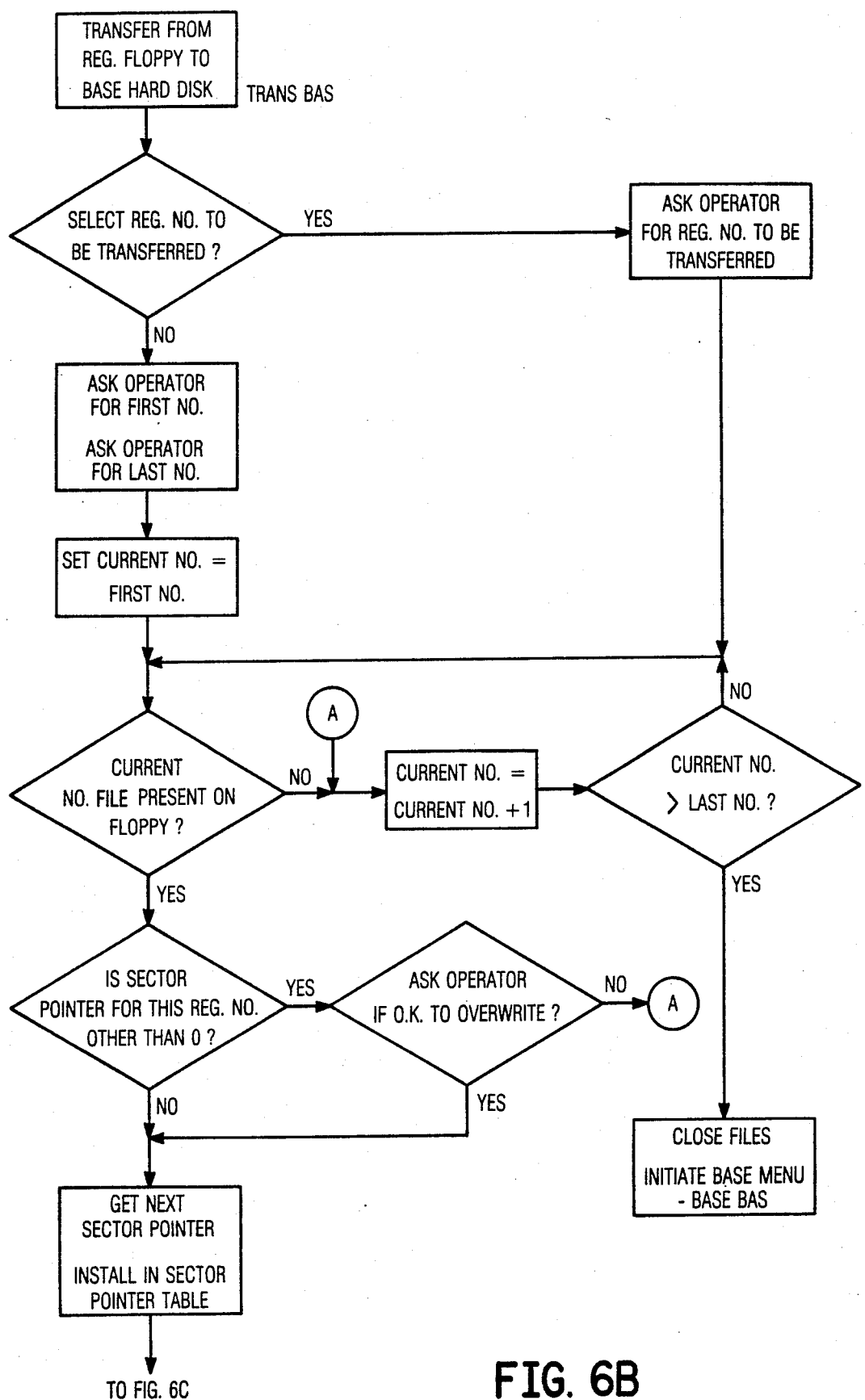
Figure 6C:
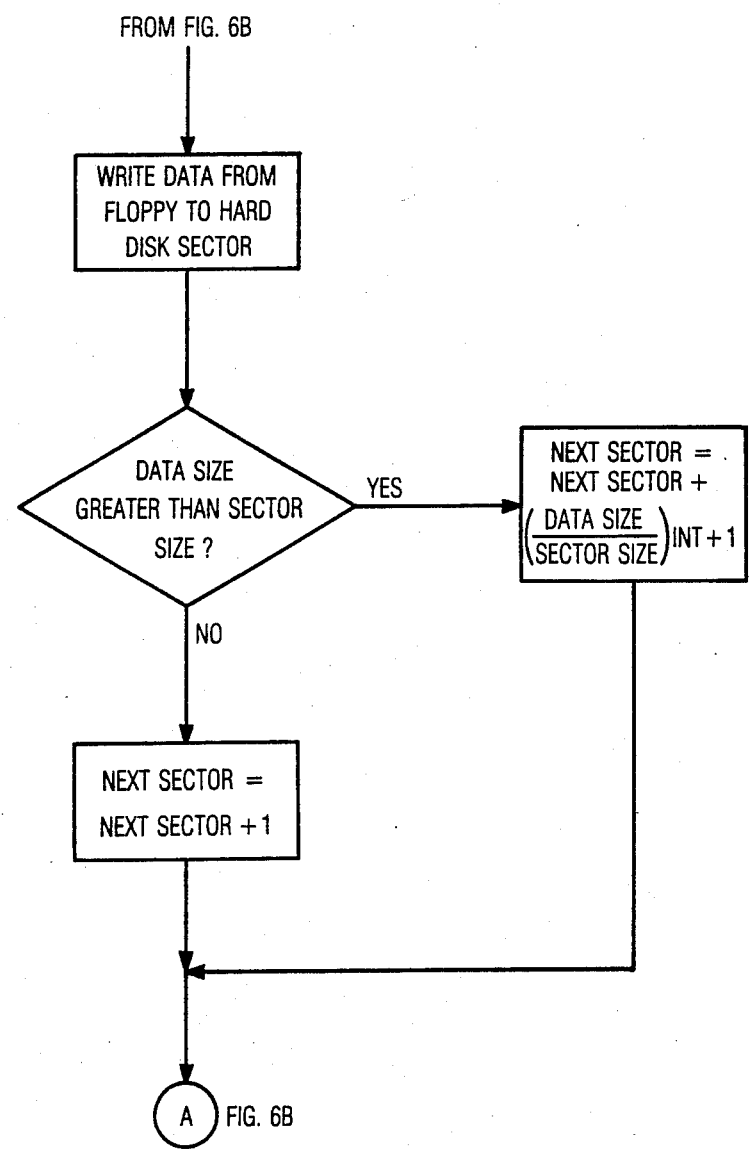

Referring to FIGS. 6B and 6C, the operator enters the registration number or numbers to be transferred from floppy diskette 15 to the hard disk storage unit in main computer 31. The operator may select individual registration numbers to be transferred or, alternatively, may select a series of numbers to be transferred by entering the first and last number of the series. A sector-pointer code is assigned to each registration number and the registration number is stored sequentially in a sector pointer table in memory. Registration information pertaining to each registrant is then written from floppy diskette 15 to the hard disk in a section of the system memory representing the sector number of the corresponding registration number. Thus, registration information pertaining to each attendee can be readily retrieved from the system memory when the corresponding registration number is entered.

Figure 6D:
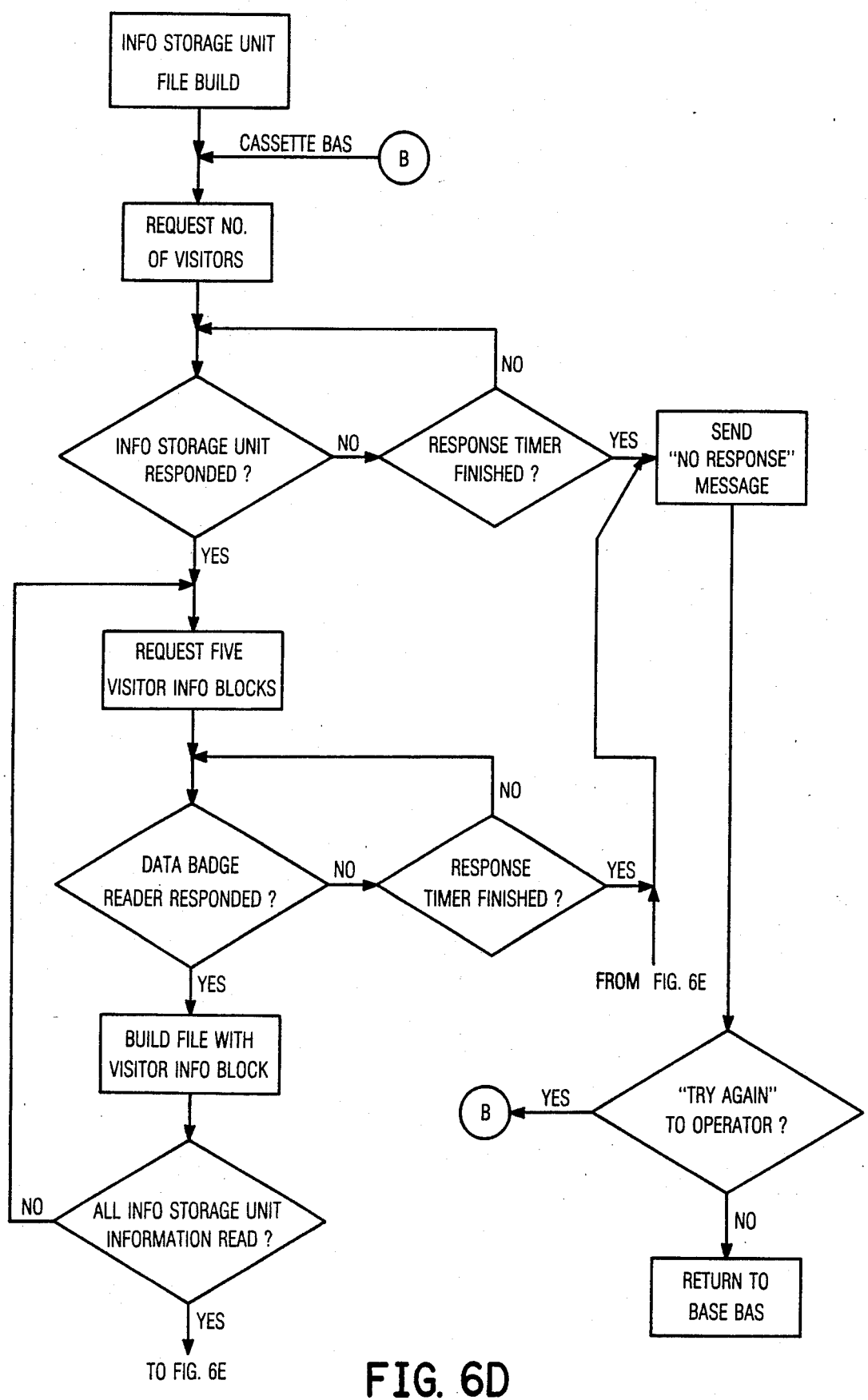
Figure 6E:
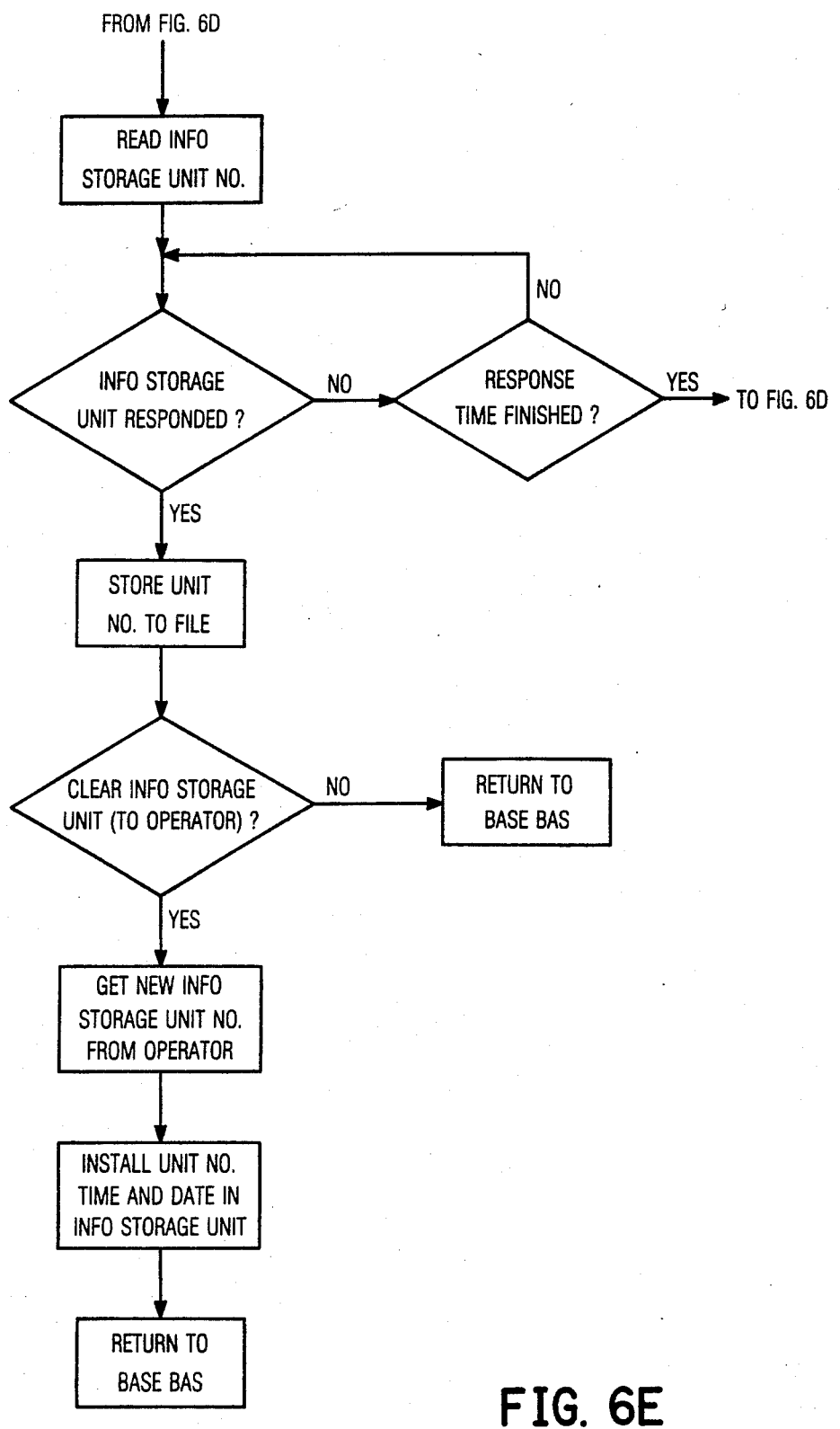

Referring to FIGS. 6D and 6E, the information stored in the various information storage units 21 is stored on the hard disk of main computer 31. Upon request of main computer 31, a selected one of the information storage units 21 transmits the total number of visitors stored in information storage unit 21. Main computer 31 will then request that the information be transmitted in blocks of five (5) visitors at a time, whereupon data representing the registration number of a visitor, the time of the visit and the particular request or inquiries made by that visitor are stored sequentially in system memory in the chronological order that each visitor visited the particular booth or exhibit where that particular information storage unit 21 was located. After all of the information has been transferred to the hard disk, the identification number of the information storage unit 21 is stored. The operator may then elect to "clear" information storage unit 21 whereupon a new identification number is assigned to and stored in information storage unit 21 for subsequent use. The program then returns to the entry point in FIG. 6B. The aforementioned sequence may be repeated for all of the other information storage units 21, so that a second data file is built, which contains information for each information storage unit 21 relating to the registration number of each visitor, the time and date of the visit and the particular request and or inquiries made by that visitor, in chronological sequence.

When all of the information has been stored in main computer 31, the operator may print out various compilations of processed information, such as, for example, the names and professional affiliations of the visitors to a particular booth during the trade show or convention, the names and numbers of visitors from a particular city or state or from a particular company, and the names and number of visitors making a particular request or inquiry at a particular booth or exhibit at the trade show or convention. One skilled in the art will appreciate that many other compilations of data may be produced by main computer 31, which may be of interest to both the organizer of the trade show or convention and to the individual booth operators.

Figure 6F:
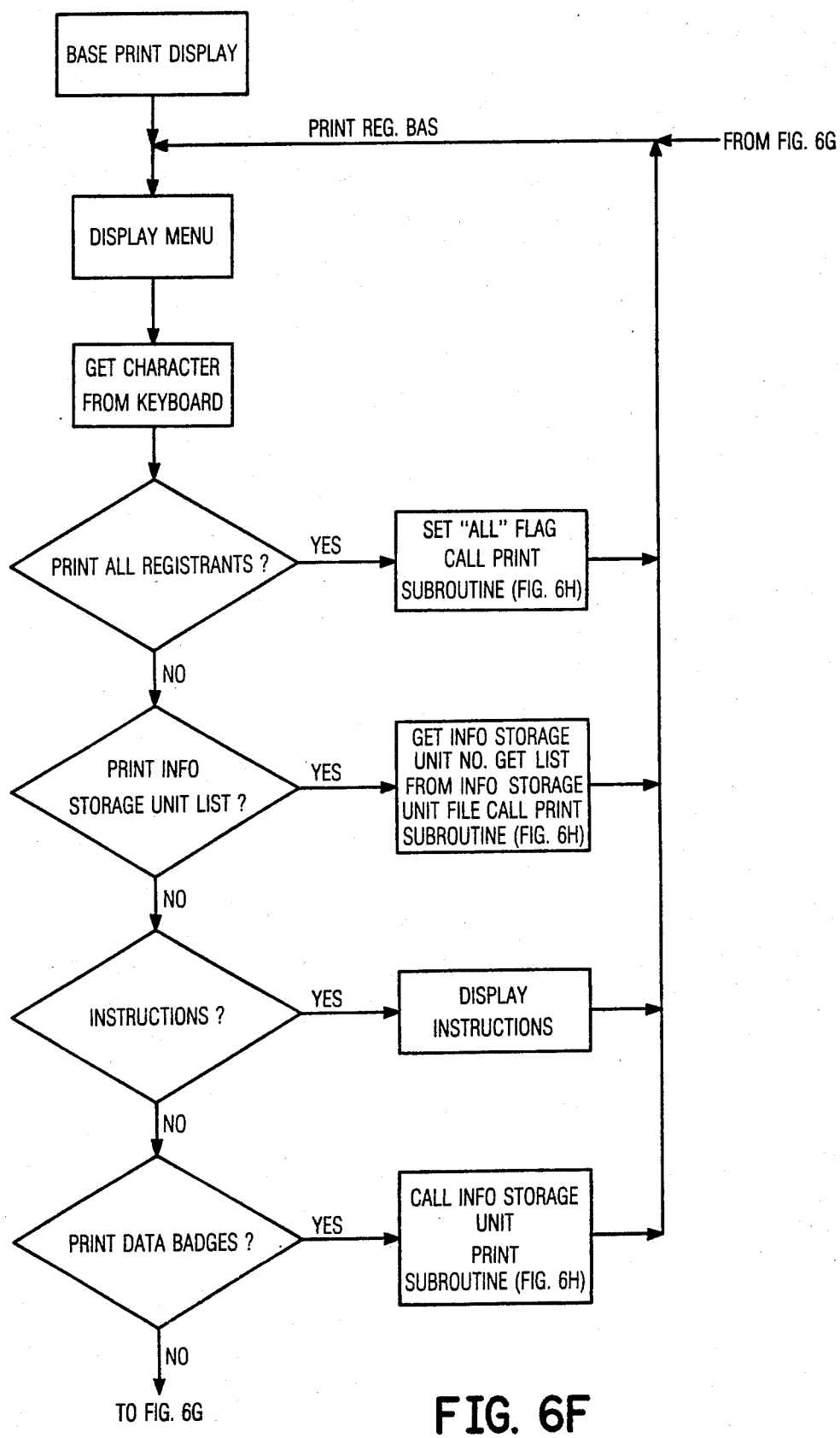
Figure 6G:
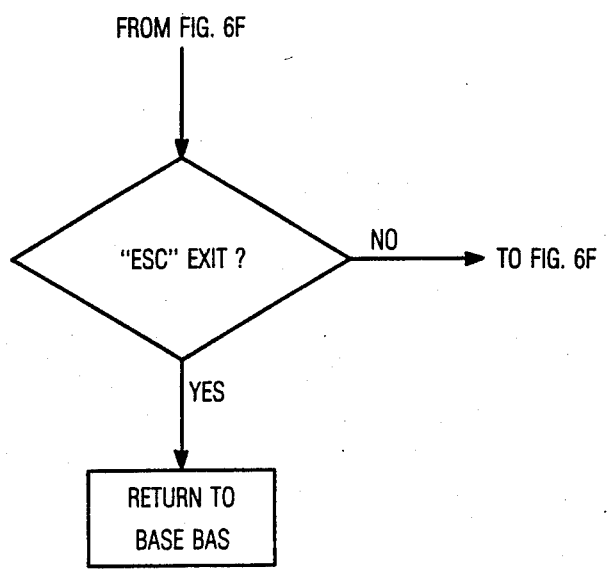
Figure 6H:
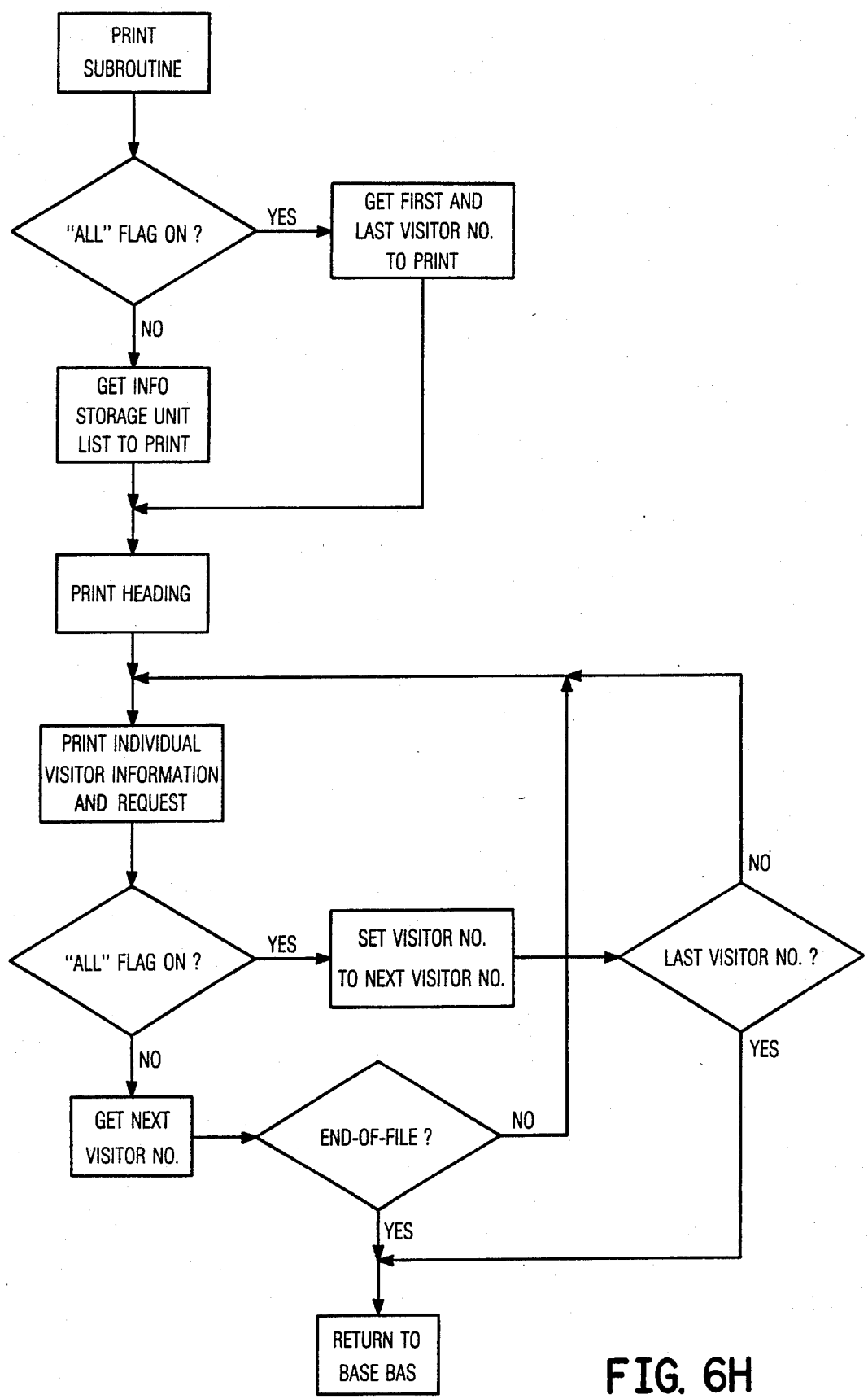

Referring to FIGS. 6F, 6G and 6H, the organizer or promoter of the trade show or convention may desire a printout of all registrants, whereupon the program sets an "ALL" flag and all registrants are retrieved from the data base. The Print Subroutine, as depicted in FIG. 6H, is then called and a list of all the attendees at the trade show or convention is printed out along with the applicable information pertaining to each attendee. If, on the other hand, it is desired to have a printout of the visitors to a particular booth or exhibit, the identification number of the particular information storage unit 21 corresponding to that particular booth or exhibit is entered by the operator and the program will retrieve visitor information from the particular information storage unit 21 and call up the Print Subroutine and print a list of the visitors to that particular booth or exhibit and selected information relating thereto in chronological order.

Figure 6I:
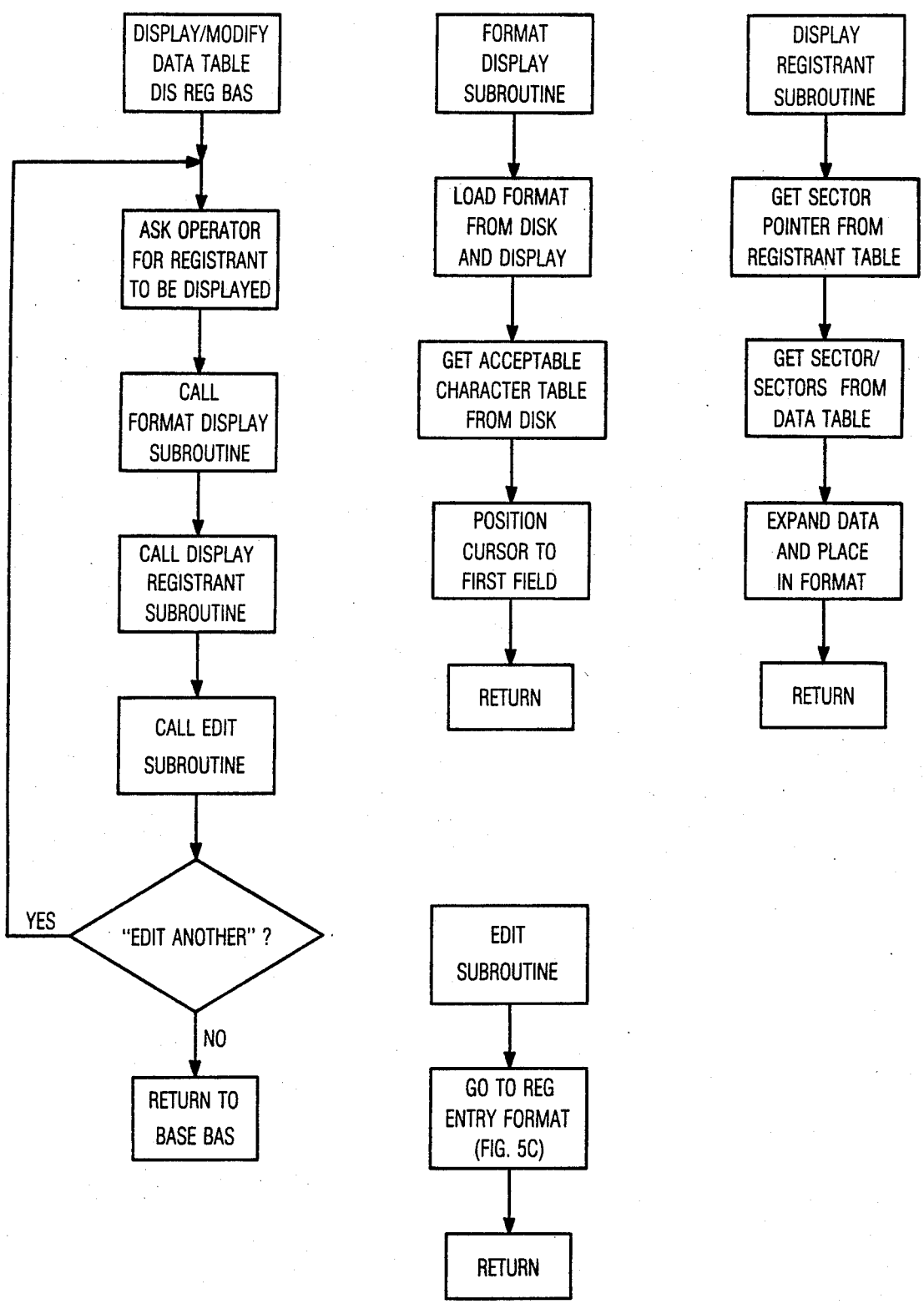

Referring to FIG. 6I, the steps by which the operator may amend or edit the registration information for a particular attendee are depicted. The user enters the registration number of the attendee whose registration information is to be amended or edited and the program calls up in sequence the Format Display Subroutine, the Display Registrants Subroutine and the Edit Subroutine. The aforementioned sequence is then repeated for subsequent registrants whose registration information is to be modified or edited. Upon completion, the program returns back to the main program entry point in FIG. 6A.

Various embodiments of the invention have now been described in detail. Since it is obvious that many changes and modifications can be made in the above details without departing from the nature of the invention, it is understood that the invention is not to be limited to said details, except as set forth in the appended claims.

What is claimed is:

1. A system for registering attendees at a trade show, convention or the like, comprising:
   input means for entering selected information relating to the attendees, said selected information including the name of each attendee and a predetermined code indicating whether or not a registration badge is to be printed for the corresponding attendee;
   first storage means for storing the information entered by said input means;
   second storage means for storing a predetermined number of sequential registration numbers to be assigned to the respective attendees;
   processing means electrically coupled to said input means and to said first and second storage means for processing said selected information in accordance with a predetermined set of instructions stored therein, said processing means including,
   means for retrieving said registration numbers from said second storage means and for assigning individual ones of said registration numbers in sequence to the respective attendees, and
   means for determining the acceptability of each character entered by said input means and for generating an error signal if a particular character is not an acceptable character for the corresponding position in a predetermined data entry format; and means for selectively printing a registration badge for each attendee for which the predetermined code corresponding to that attendee indicates that a badge is to be printed.

2. The system according to claim 1 wherein said registration badge includes the name and professional affiliation of the corresponding attendee in human-readable form and the registration number of the corresponding attendee in bar-coded form.

3. The system according to claim 2 wherein said registration badge further includes bar-coded information indicating the activities to which the corresponding attendee is entitled admission at the trade show, convention or the like.

4. The system according to claim 1 wherein said system further includes display means for displaying selected information entered into the system.

5. The system according to claim 1 further including third storage means for storing said registration numbers assigned to the respective attendees in sequential numerical order, each registration number being assigned a discrete sector pointer code in said third storage means, and fourth storage means for storing registration information for each attendee entered by said input means at a predetermined location in said fourth storage means corresponding to the particular sector pointer code assigned to the particular registration number corresponding to a particular attendee, registration information for each attendee being selectively retrievable from said fourth storage means by entering from said input means the corresponding registration number for that particular attendee.

6. In an electronic information processing system having memory means for storing information and processing means for processing said information, a method for registering attendees at a trade show, convention or the like, said method comprising the steps of:

entering selected information relating to each attendee, said selected information including the name of each attendee and a predetermined code indicating whether or not a registration badge is to be printed for that particular attendee;

storing the selected information entered by said input means in said memory means;

storing a predetermined number of sequential registration numbers to be assigned to the respective attendees in said memory means;

retrieving said registration numbers in sequence from said memory means and assigning individual ones of said registration numbers in sequence to the respective attendees;

determining the acceptability of each character of information entered and generating an error signal if a particular character is not an acceptable character for the corresponding position in a predetermined data entry format; and selectively printing a registration badge for each attendee for which the predetermined code corresponding to that particular attendee indicates that a registration badge is to be printed.

7. An electronic system for keeping track of selected activities of attendees at a trade show, convention or the like, comprising:

means for providing a first set of information codes identifying the respective attendees;

means for providing a second set of information codes representing selected inquiries and requests for information made by the attendees at the trade show, convention or the like;

means for reading said first set of information codes and for generating a respective first set of electrical signals indicative thereof;

means for reading selected ones of said second set of information codes corresponding to the inquiries and requests for information made by a particular attendee and generating a respective second set of electrical signals indicative thereof;

timekeeping means for keeping track of time of day and date;

processing means electrically coupled to said reading means and said timekeeping means for processing said first and second sets of electrical signals in accordance with a predetermined set of instructions; and memory means electrically coupled to said processing means for storing processed information, said processing means being responsive to timekeeping signals from said timekeeping means for storing in said memory means the time of day and date on which selected processed information is stored in said memory means.

8. The system according to claim 7 wherein said first and second sets of information codes are comprised of respective bar-coded information codes, said first set of bar-coded information codes including a predetermined registration number assigned to each attendee and said second set of bar-coded information codes including bar-codes representing a selected list of standard inquiries and requests for information from said attendees.

9. The system according to claim 8 wherein each of said attendees is furnished with a registration badge bearing his assigned bar-coded registration number and selected locations at said trade show, convention or the like are provided with a hard copy of said second set of bar-coded information codes.

10. The system according to claim 9 wherein said selected locations correspond to individual booths and exhibits at said trade show, convention or the like.

11. The system according to claim 7 further including means for communicating with an external data processing system, including means for transmitting information stored in said memory means to said external data processing system.

12. The system according to claim 7 wherein said processed information is stored in said memory means in chronological sequence, said processed information including the registration number of the particular attendee, the time and date on which the attendee made a particular request or inquiry, and the nature of such request and inquiry.

13. The system according to claim 12 wherein said system includes a plurality of information storage units positioned at selected locations at said trade show, convention or the like for gathering and storing information relating to the activities of the attendees, each of said information storage units being assigned a unique identification number.

14. The system according to claim 13 further including central processing means external to said information storage units for providing relatively permanent storage of the information stored in each of said information storage units, said information being stored in said central processing means in chronological sequence in accordance with the chronological sequence in which such information is stored in each of said information storage units, the information which is stored in said central processing means including the registration number of each attendee, the time and date of a request or inquiry made by that attendee at the selected location at which the corresponding information storage unit is positioned, the nature of such requests or inquiries and the identification number of the corresponding information storage unit.

15. The system according to claim 14 wherein said central processing means includes means for providing selected compilations based on the information stored therein.

16. The system according to claim 15 wherein said selected compilations include a listing of all visitors to a particular location at the trade show, convention or the like in chronological sequence.

17. The system according to claim 15 wherein said selected compilations include a listing of all visitors to a particular location at the trade show, convention or the like from a particular company or geographical area.

18. The system according to claim 15 wherein said selected compilations include a listing of all visitors to a particular location at the trade show, convention or the like who have made a particular inquiry or request for information at that location.

19. The system according to claim 13 wherein each of said information storage units includes:
   a bar-code reader for reading bar-coded information representing the respective registration numbers of the attendees and the respective inquiries and requests for information made by said attendees at the corresponding location of said information storage unit;
   a bar-code decoder for decoding said bar-coded information read by said reader and for generating electrical information signals indicative thereof;
   timekeeping means for keeping track of time of day and calendar date;
   processing means for processing said electrical information signals in accordance with a predetermined instruction set;
   storage means for storing said processed information in chronological sequence; and
   communication means for communicating with an external data processing system, including means for transmitting stored information to said external data processing system.

20. In an electronic data processing system, a method for keeping track of selected activities of attendees at a trade show, convention or the like, comprising the steps of:
   assigning a unique registration number to each attendee;
   providing a first set of information codes corresponding to the respective registration numbers assigned to the individual attendees;
   providing a second set of information codes representing selected ones of a plurality of inquiries and requests for information made by said attendees;
   reading said first set of information codes and generating a respective first set of electrical signals indicative thereof;
   reading selected ones of said second set of information codes representing the specific inquiries and requests for information made by individual attendees and generating a respective second set of electrical information signals indicative thereof;
   keeping track of time of day and date;
   processing said first and second sets of electrical signals in accordance with a predetermined set of instructions stored therein; and
   storing said processed information in chronological sequence in accordance with the respective times of day and dates on which said inquiries and requests for information are made by said attendees, said stored information including time of day and date on which each inquiry and request for information is made.

21. An electronic system for gathering and processing information relating to the identification and activities of attendees at a trade show, convention or the like, comprising:
   input means for entering selected information relating to the attendees, said information including the respective names of the attendees and a predetermined code indicating whether or not a registration badge is to be printed for a particular attendee;
   first storage means for storing said selected information;
   second storage means for storing a predetermined number of sequential registration numbers to be assigned to the respective attendees;
   means for retrieving said registration numbers from said second storage means and for assigning said registration numbers in sequence to the respective attendees;
   means for determining the acceptability of each character entered and for generating an error signal if a particular character is not an acceptable character for the corresponding position in a predetermined data entry format;
   means for selectively printing a registration badge for an attendee when said predetermined code for that particular attendee indicates that a badge is to be printed, said registration badge including the corresponding registration number for that attendee in coded form;
   means for providing a set of information codes representing selected inquiries and requests for information made by said attendees at said trade show, convention or the like; and
   a plurality of information storage units positioned at selected locations at the trade show, convention or the like for gathering and storing information relating to the activities of the attendees, each of said information storage units having:
   means for reading said coded registration number on the registration badge of each attendee and for reading selected ones of said information codes corresponding to the particular inquiries and requests for information made by a particular attendee,
   timekeeping means for keeping track of time of day and date, and
   third storage means for storing information representing the respective registration numbers and respective inquiries and requests for information made by the attendees in the chronological sequence in which such inquiries and requests for information were made, said stored information including the time of day and date on which each inquiry and request for information is made.

* * * * *